Nov. 27, 1951 A. TYKULSKY 2,576,157

WAVE SIGNALING SYSTEM

Filed Oct. 27, 1950

*INVENTOR.*

ALEXANDER TYKULSKY

*BY* Lawrence Glassman

ATTORNEY

Patented Nov. 27, 1951

2,576,157

UNITED STATES PATENT OFFICE 2,576,157

WAVE SIGNALING SYSTEM

Alexander Tykulsky, West End, N. J., assignor to the United States of America as represented by the Secretary of the Army Application October 27, 1950, Serial No. 192,560

7 Claims. (Cl. 250—13)

Figure 1:
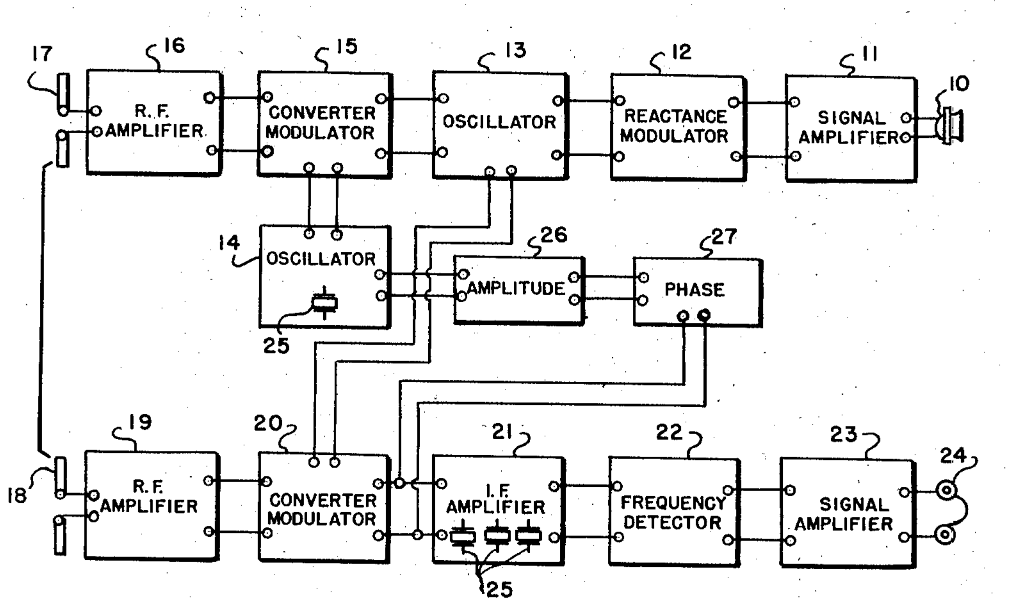

(Granted under the act of March 3, 1883, as amended April 30, 1928; 370 O. G. 757)

The invention described herein may be manufactured and used by or for the Government for governmental purposes, without the payment of any royalty thereon.

This invention relates to wave signaling systems of the type which employ carrier waves modulated in accordance with signals for two-way communication. In particular, the invention relates to a wave signaling system for simultaneously transmitting and receiving with waves of substantially the same carrier frequency.

For a great many years in radio communication a system has been desired wherein the transmitter and receiver in at least one of the stations can be operated on the same carrier frequency without having the high power of the transmitter adversely affect the operation of the receiver. A large variety of solutions to this problem have been proposed and a certain amount of progress made, but up to the present time no completely satisfactory solution of the problem appears to have been attained.

It is, accordingly, an object of the present invention to provide a wave signaling system for simultaneously transmitting and receiving with waves of substantially the same carrier frequencies in an improved manner which avoids many of the disadvantages and limitations of the prior art.

It is a further object of the invention to provide a radio wave signaling system for simultaneously transmitting and receiving with waves of substantially the same carrier frequency wherein a certain portion of the transmitted wave energy, which is incident at the receiver of the same station, is effectively eliminated in its adverse effect on the operation of the receiver.

In accordance with the present invention, there is provided a wave signaling system for simultaneously transmitting and receiving with waves of the same carrier frequency which comprises at one station a transmitter and a receiver. The transmitter comprises means for generating and transmitting a carrier wave angularly modulated in accordance with a local signal. The receiver comprises means for receiving both an incoming wave of substantially the same carrier frequency, angularly modulated in accordance with a distant signal and a residual portion of the wave from the transmitter. Means are provided for converting the residual portion to a wave of constant frequency, together with means for substantially eliminating, in the receiver, the wave of constant frequency.

Also in accordance with the present invention, there is provided a wave signaling system for simultaneously transmitting and receiving with waves of the same carrier frequency which comprises at one station a transmitter and a receiver. The transmitter comprises means for generating and transmitting a carrier wave angularly modulated in accordance with a local signal. The receiver comprises means for receiving both an incoming wave of substantially the same carrier frequency as that of the transmitter, and which is angularly modulated in accordance with a distant signal, and an undesired portion of the wave from the transmitter. The receiver also comprises means, operatively controlled by the transmitter, for inversely, angularly modulating the received waves in accordance with the local signal to produce waves in a band of frequencies which correspond to both of the signals and a wave of constant frequency in this band which corresponds to the undesired portion. The receiver also comprises means for sharply attenuating the wave of constant frequency and means for detecting the waves in the band of frequencies to reproduce the signals.

For a better understanding of the invention, together with other and further objects thereof, reference is had to the following description taken in connection with the accompanying drawings and its scope will be pointed out in the appended claims.

In the drawings, Fig. 1 is a block diagram of a station of the wave signaling system arranged in accordance with a preferred embodiment of the invention and Figs. 2A and 2B are frequency scale diagrams for use in illustrating the operation of the system.

Referring now more particularly to the drawings, in Fig. 1 there is shown in block diagram a station of the system comprising a transmitter and a receiver. All of the block elements per se are of a construction and operation well known in the art and, therefore, the specific circuits are omitted. The transmitter is comprised of a microphone 10 to serve as source of local signal energy, which is coupled to the input of a signal amplifier 11. The output of the amplifier 11 is coupled to the input of a reactance tube modulator 12 and the output of modulator 12 is coupled to an oscillator 13. Oscillator 13 is designed to have a normal or center frequency labeled $f_0$, which can be deviated or frequency modulated by reactance tube 12. The output oscillations of oscillator 13 are coupled to a converter modulator 15, to which is also coupled the output of a fixed frequency oscillator 14. The fixed frequency of oscillator 14 is precisely set and controlled by a crystal element 25, operating at a frequency $f_x$. The output of modulator 15 is coupled to the input of radio frequency amplifier 16, and by design 16 is adapted to select and develope a spectrum or band of frequencies corresponding to $f_x$ plus $f_o \pm \Delta f_o$, where $\Delta f_o$ represents the maximum deviation in frequency from $f_o$. This band is at least equal to, and generally greater than, twice the band of signaling frequencies to accommodate the sidebands present in a frequency modulated wave. The center frequency of the band is the carrier $f_c$ which equals $f_x + f_o$. The output of amplifier 16 is coupled to a radiating system or transmitting antenna 17.

The receiver of the station is comprised of a receiving radiator or antenna 18, which is decoupled from the transmitting antenna 17 as indicated by the bracket in the drawing. This decoupling or balancing between antenna 17 and antenna 18 will ordinarily not be complete but will be made as effective as is feasible in the design and construction of the station and ordinarily there will be an undesired residual amount of coupling of the transmitting energy from the antenna 17 to receiving antenna 18. The output of receiving antenna 18 is coupled to the input of RF amplifier 19 and the output of 19 is coupled to an input of the converter modulator 20. Also coupled to an input of modulator 20 is an output of oscillator unit 13 of the transmitter channel. The output of modulator 20 is coupled to the input of intermediate frequency amplifier 21 and within the unit 21 are a plurality of crystal filter circuits, each indicated by the numeral 25, for the purpose of showing that they operate at the same frequency $f_x$ as the crystal unit 25 of oscillator 14. Amplifier 21 may be of any known construction and by design is a multi-stage vacuum tube amplifier having a band-pass characteristic corresponding to the frequency range $$f_c - (f_o \pm \Delta f_o)$$

which equals $f_x \pm \Delta f_o$. In other words, this IF band pass characteristic will be greater than the range of deviation in frequency in order to pass the essential side frequencies of the spectrum, as is well known in frequency modulation receiver design. At the center frequency, $f_x$, the band-pass characteristic has a sharp attenuation dip, as illustrated in Fig. 2B, which is caused by the plurality of series resonant paths, each of which includes one of the crystal elements 25. The design and construction of an amplifier having such attenuation elements is well known and hence specific circuits are not shown. The output of amplifier 21 is applied to frequency detector 22 and the output of frequency detector 22 is applied to the input of signal amplifier 23. Amplitude limiters and other circuit elements which might be employed in a well designed FM receiver may, of course, be included but, for simplicity, are not illustrated. The output of signal amplifier 23 is indicated as being applied to a pair of receiver headphones 24, which reproduce the signals. An output of the transmitter oscillator 14 is also coupled to an amplitude control unit 27, the output of which in turn is coupled to a phase control unit 28. The output of phase control unit 28 is coupled to an input of the receiver IF amplifier 21. By adjustment of units 26 and 27, energy of frequency $f_x$ can thus be applied to amplifier 21 in chosen amplitude and phase to serve as a neutralizing or attenuating voltage as will be explained more fully hereafter.

Considering now the operation of the system and referring to the frequency scale diagrams of Fig. 2 for illustration, the transmitter functions as follows: The local signal, such as a voice signal originating at microphone 10, is amplified in the signal amplifier 11, the output of which actuates the reactance tube modulator 12. Oscillator 13 has a center frequency of $f_o$ and under control of reactance modulator 12, the frequency of oscillator 13 is varied relative to the center frequency $f_o$ in accordance with the local signal to a maximum deviation $\Delta f_o$, to provide an angularly modulated (that is, frequency or phase modulated) intermediate frequency wave. An output of oscillator 13 is coupled to the converter 15, together with oscillations from oscillator 14 of chosen fixed frequency $f_x$.

Figure 2:
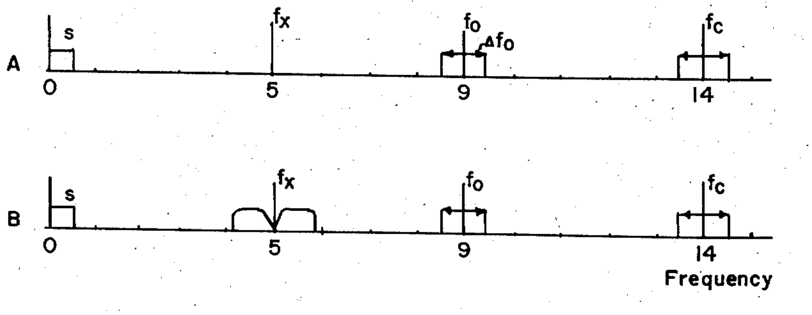

Referring to the frequency scale diagram A of Fig. 2, the transmitter operation is there indicated by showing at the low frequency end of the scale a band, $s$, of signaling frequencies. On this scale, the fixed frequency $f_x$ of oscillator 14 is indicated as 5 megacycles. The center frequency $f_o$ of oscillator 13 is indicated as 9 megacycles, but varying plus and minus over a band of maximum deviation $\Delta f_o$ which corresponds to the maximum amplitude of signal in the signaling band $s$.

The output of modulator 15 is indicated in the scale diagram as having a center or carrier frequency $f_c$ of 14 megacycles, which is the sum frequency of $f_x$ and $f_o$ and the deviation of this output carrier frequency is shown as having the same maximum deviation $\Delta f_o$ corresponding to the maximum amplitude of the signaling wave. The output of modulator 15 is amplified in RF amplifier 16 which has a pass-band adequate to amplify the carrier frequency $f_c$ and the essential side frequencies. The output of 16 is then radiated via the antenna 17 as a carrier wave which is angularly modulated in accordance with the local signal.

Considering now the operation of the receiver of the station: an incoming carrier wave angularly modulated in accordance with the signal of a distant station is received by antenna 18 and the output of 18 is supplied to the input of RF amplifier 19. Also received on antenna 18 and supplied to amplifier 19 is a residual undesired portion of the wave energy radiated by the transmitter antenna 17. The output of RF amplifier 19 is supplied to a frequency converter modulator 20, together with energy from oscillator 13.

To fully understand the operation, let us assume for the moment that the decoupling between antenna 17 and 18 is complete so that no residual or unwanted energy from the transmitter is being received. Let us further assume that the incoming wave, modulated in accordance with a distant signal, is being received and that no signal is being transmitted from microphone 10. Under these conditions, the oscillator 13 supplies a heterodyne frequency $f_o$ to modulator 20, which converts the output wave energy from unit 19 to wave energy of intermediate frequency and this wave energy of intermediate frequency is amplified in unit 21. The output of 21 is, therefore, a wave of intermediate frequency which is frequency modulated in accordance with the distant signal. This is indicated in the frequency scale diagram B of Fig. 2, where the incoming wave is indicated as having a center carrier frequency $f_c$ again located at 14 megacycles and deviated plus and minus by a maximum value of $\Delta f_o$.

Since the beating oscillator frequency $f_o$ is at 9 megacycles, these waves are converted by modulator 20 to the band of frequency having a center frequency $f_x$ at 5 megacycles. This band is ordinarily wider than the maximum deviation frequency as heretofore explained.

It has been pointed out that IF amplifier 21 is an amplifier designed to amplify the band of intermediate frequencies, but is equipped with a plurality of circuits each containing a crystal element 25. The circuit arrangements are such that the center IF carrier frequency $f_x$ is very sharply attenuated by the crystal elements so that the pass-band of the IF amplifier 21 is as indicated in Fig. 2, diagram B, which shows a sharp dip or attenuation at the center or intermediate frequency $f_x$ in a band wide enough to pass the essential side frequencies of an angularly modulated carrier wave. Actually, the attenuation dip is much sharper than illustrated.

The output of amplifier 21 is supplied to frequency detector 22, which is of conventional form to provide an output voltage which varies linearly with the frequency deviation of an input IF wave of constant amplitude. The usual FM discriminator circuit is suitable for this purpose. Because of the presence of the crystal filter attenuation dip in the pass-band at the IF center frequency $f_x$, as shown in diagram B of Fig. 2, the amplitude of the wave applied to the detector 22 falls in this region, but in practice it has been found that this does not materially affect the operation of the receiver for frequency modulated or phase modulated signals and so does not to a harmful degree hurt the quality of the received signals for ordinary telephonic communication purposes. The reason for this may be explained as due to the fact that a frequency modulated carrier is a spectrum comprised of carrier and side frequencies wherein the carrier is frequently of reduced or zero amplitude. Therefore, the sharp attenuation in this region causes little distortion. The output of frequency detector 22 is amplified by signal amplifier 23 which supplies the reproduced signal to the headphones 24.

Let us again consider the operation of the system, still considering the decoupling as complete between antenna 17 and antenna 18 so that there is no undesirable interferring signal from the local transmitter, but this time assume that the distant modulating signal has ceased as, for example, by the distant operator ceasing to talk and that only the distant carrier wave is being received. Also, consider that the local operator is now talking to produce the local signal. Under these conditions the output of RF amplifier 19 to modulator 20 is of fixed frequency $f_c$, and the heterodyning output of unit 13 supplied to an input of modulator 20 is now angularly modulated over the range $f_o \pm \Delta f_o$. The operation of units 21, 22, 23, 24 is as before described and under these conditions the telephone receivers 24 reproduce the local operator's voice or signal as a desirable side tone.

The operation here described is termed an inverse modulation because the difference frequency conversion effected by the converter modulator 22 is inverse to the sum frequency conversion effected by converter modulator 15 in the transmitter. This will be evident when we consider that for the transmitter the operation can be expressed by the equation:

(1) $(f_o \pm \Delta f_o) + f_x = f_c \pm \Delta f_o$ but in the receiver, the conversion equation for the production of the side tone signal can be expressed as:

(2) $f_c - (f_o \pm \Delta f_o) = f_x \mp \Delta f_o$

In other words, the deviation of frequency is opposite in the two cases.

When both the distant and local signals occur simultaneously, both signals are reproduced by the receiver and the question of distortion is academic since the result is for one party to interrupt the other, as in ordinary conversation.

Finally, let us again consider the operation with a certain amount of coupling or residual unwanted signal from antenna 17 being received upon antenna 18. First, if the carrier wave from 17 received on antenna 18 is unmodulated by a local signal, it is a fixed frequency and will ordinarily be of low enough amplitude so that the elements in units 19 and 20 are not overloaded. This energy of carrier frequency $f_c$ is heterodyned in modulator 20 by energy of frequency $f_o$ from unit 13 to produce an intermediate frequency wave $f_x$ which is completely or substantially attenuated by the crystal elements 25 of amplifier 21, so that there is no output at this frequency from unit 21 which could be further amplified in units 22 and 23 to overload and prevent the proper operation of the receiver. If now the operator is talking into microphone 10 to provide a signal, it will be noted that the effect of the signal is to modulate the oscillations $f_o$ of unit 13 which, in turn, angularly modulate the output from antenna 17, but that in the receiving channel this undesired wave energy is inversely heterodyne modulated by the coupling from unit 13 so that irrespective of whether or not a signal originates at microphone 10, the output of modulator 20, or, more exactly, that part of it due to the unwanted residual coupling of the antennae, is always of constant frequency $f_x$ and is attenuated to a harmless value in amplifier 21. This can be stated in equation form as follows:

(3) $f_c \pm \Delta f_o - (f_o \pm \Delta f_o) = f_x$

The operation of the system, however, with an incoming wave to provide the distant signal or to provide a side tone local signal, is unaffected.

In the general operation of the receiver, all of the described modes are effective. The transmitter radiates a carrier wave angularly modulated in accordance with a local signal, the receiver in our example receives an incoming wave of the same carrier frequency angularly modulated in accordance with a distant signal which is reproduces. A side tone of the local signal is also reproduced due to the inverse modulation of the received carrier wave so that two-way operation is effected as in line telephone practice. But, most important, a tolerance in the balance or decoupling of the transmitter and receiver antennae is effected by the inverse modulation in the receiver, operatively controlled by the transmitter. This effectively reduces the interference of the local transmitter to a fixed frequency $f_x$ in a range where it can be effectively attenuated to a harmless value and this is accomplished without impairing the operation of the receiver. This inverse heterodyne or conversion modulation, accordingly, produces waves in the band of frequencies of which $f_x$ is the center frequency and which correspond to both the local and the distant signals together with a wave of constant frequency $f_x$ in the band which corresponds to the undesired interference. The attenuation dip in the pass-band characteristic of amplifier 21 provides means for sharply attenuating the wave of constant frequency, so that the waves in this band which correspond to the local and distant signals can be detected and reproduced.

Thus far, in the description of the operation, no mention has been made of units 26 and 27. The purpose of these units is alternative or supplemental to the crystal filter elements 25 in IF amplifier 21, for the purpose of sharply attenuating or neutralizing the center frequency $f_x$.

If it is assumed that the residual undesired coupling of wave energy from transmitter to receiver is constant and, as has been described, the inverse modulation in the receiver converts this interfering energy to the fixed frequency $f_x$, then it will be clear that the amplitude and phase of the converted interference of frequency $f_x$ at the input of amplifier 21 will be constant and can be neutralized by a wave of equal amplitude and opposite polarity, derived from the oscillator unit, 14. Accordingly, an output voltage wave from unit 14 is adjusted in amplitude by a setting of the coupling in unit 27 to provide a source of voltage which will neutralize the interfering wave at the input of IF amplifier 21.

Under ideal conditions, this neutralization alone will suffice to provide sharp attenuation or the complete elimination of the undesired wave and the crystal filters 25 of unit 21 may then be omitted, since no actual dip in the IF pass-band characteristic will be needed. This will be evident when it is noted that a drift in the frequency $f_x$ of the oscillator 14 is automatically compensated by corresponding drifts in the angular modulation of the transmitted wave and in the inverse modulation in the receiver.

Under practical conditions, however, the decoupling of the antennae may not remain constant due to variations caused by weather changes, mechanical instability and the like. In addition to these variations, the movements of persons and objects near the transmitter antennae will often cause reflections or variations in the reflection of wave energy radiated from the transmitter back to the receiver. Accordingly, the undesired wave energy from the transmitter, coupled to the receiver, may vary in amplitude and in phase. When it is noted that in heterodyne reception a change in phase or frequency of the receiver carrier wave causes a directly corresponding change in the phase or frequency of the converted IF wave, it will be clear that the neutralization of the interfering wave at the input of amplifier 21 may be very critical. There is, however, in compensation, the advantage that neutralization is here being effected at a lower intermediate frequency.

It follows, then, that in some classes of service where the apparatus is such as to maintain a constant decoupling value, the neutralization via units 26 and 27 will, of itself, be sufficient. In other classes of service, where the decoupling is relatively unstable, the neutralization method may preferably be dispensed with. Generally, however, the combined use of neutralization and IF attenuation is a preferred arrangement.

While crystal filters 25 in the IF amplifier have been illustrated, other methods of sharply attenuating the IF center frequency may be employed. For example, attenuation may be accomplished by a negative feed-back from the output to the input of amplifier 21, wherein the feed-back path is designed to be effective only in the region of the center frequency $f_x$. A feed-back of this type may also be critically determined by a crystal control element 25 included in the negative feed-back path.

While our description has used identical carrier frequencies $f_c$ for both the outgoing and incoming waves, it is not essential that they be the same. The incoming carrier may differ somewhat from the outgoing carrier, without affecting the described operation. It should not, however, differ to the extent that the converted carrier of intermediate frequency fails to lie near the center of the IF pass-band of amplifier 21. Accordingly, the arrangements described are effective for carrier waves of the same, or substantially the same, frequency.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A wave signaling system for simultaneously transmitting and receiving with waves of substantially the same carrier frequency comprising a station having a transmitter and a receiver, said transmitter comprising means for generating and transmitting a carrier wave angularly modulated in accordance with a local signal, said receiver comprising means for receiving both an incoming wave of substantially the same carrier frequency, angularly modulated in accordance with a distant signal and a residual portion of the wave from said transmitter, means for converting said residual portion to a wave of constant frequency and means for substantially eliminating in said receiver said wave of constant frequency.

2. A wave signaling system for simultaneously transmitting and receiving with waves of substantially the same carrier frequency comprising a station having a transmitter and a receiver, said transmitter comprising means for generating and transmitting a carrier wave angularly modulated in accordance with a local signal, said receiver comprising means for receiving both an incoming wave of substantially the same carrier frequency, angularly modulated in accordance with a distant signal and a residual portion of the wave from said transmitter, means operatively controlled by said transmitter for converting said residual portion to a wave of constant frequency and means for substantially eliminating in said receiver said wave of constant frequency.

3. A wave signaling system for simultaneously transmitting and receiving with waves of substantially the same carrier frequency comprising a station having a transmitter and a receiver, said transmitter comprising means for generating and transmitting a carrier wave angularly modulated in accordance with a local signal, said receiver comprising means for receiving both an incoming wave of substantially the same carrier frequency, angularly modulated in accordance with a distant signal and a residual portion of the wave from said transmitter, means operatively controlled by said transmitter for inversely angularly modulating said received waves in accordance with said local signal to convert said residual portion to a wave of constant frequency and means for substantially eliminating in said receiver said wave of constant frequency.

4. A wave signaling system for simultaneously transmitting and receiving with waves of substantially the same carrier frequency comprising a station having a transmitter and a receiver, said transmitter comprising means for generating and transmitting a carrier wave angularly modulated in accordance with a local signal, said receiver comprising means for receiving both an incoming wave of substantially the same carrier frequency, angularly modulated in accordance with a distant signal, and an undesired portion of the wave from said transmitter, means in said receiver, operatively controlled by said transmitter, for inversely, angularly modulating said received waves in accordance with said local signal, to produce waves in a band of frequencies which correspond to both of said signals and a wave of constant frequency in said band which corresponds to said undesired portion, means for sharply attenuating said wave of constant frequency and means for detecting said waves in said band of frequencies to reproduce said signals.

5. A wave signaling system for simultaneously transmitting and receiving with waves of substantially the same carrier frequency comprising a station having a transmitter and a receiver, said transmitter comprising sum frequency converter means for generating a carrier wave angularly modulated in accordance with a local signal, said receiver comprising means for receiving both an incoming wave of substantially the same carrier frequency, angularly modulated in accordance with a distant signal, and an undesired portion of the wave from said transmitter, difference frequency converter means in said receiver, operatively controlled by said transmitter for inversely, angularly modulating said received waves in accordance with said local signal, to produce waves in a band of intermediate frequencies which correspond to both of said signals and a wave of constant frequency in said band which corresponds to said undesired portion, means for sharply attenuating said wave of constant frequency and means for detecting said waves in said band of frequencies to reproduce said signals.

6. A wave signaling system for simultaneously transmitting and receiving with waves of substantially the same carrier frequency comprising a station having a transmitter and a receiver, said transmitter comprising means for generating an intermediate frequency wave angularly modulated in accordance with a local signal, and means for converting said modulated wave to a chosen carrier frequency, said receiver comprising means for receiving both an incoming wave of substantially the same carrier frequency, angularly modulated in accordance with a distant signal, and an undesired portion of the carrier wave from said transmitter, means in said receiver, operatively controlled by said modulated wave of intermediate frequency from said transmitter for inversely converting said received waves in accordance with said local signal to produce waves in a band of frequencies which correspond to both of said signals and a wave of constant frequency in said band which corresponds to said undesired portion, means for sharply attenuating said wave of constant frequency and means for detecting said waves in said band of frequencies to reproduce said signals.

7. A wave signaling system for simultaneously transmitting and receiving with waves of substantially the same carrier frequency comprising a station having a transmitter and a receiver, said transmitter comprising means for generating and transmitting a carrier wave angularly modulated in accordance with a local signal, said generating means comprising means for angularly modulating a wave of intermediate frequency and means comprising a source of oscillations of fixed frequency for converting said wave of intermediate frequency to said carrier frequency, said receiver comprising means for receiving both an incoming wave of substantially the same carrier frequency, angularly modulated in accordance with a distant signal, and an undesired portion of the wave from said transmitter, means in said receiver, operatively controlled by said transmitter for inversely, angularly modulating said received waves in accordance with said local signal, said inverse modulating means comprising means for combining and converting said wave of intermediate frequency and said received waves to produce waves in a band of frequencies which correspond to both of said signals and a wave of said fixed frequency in said band which corresponds to said undesired portion, means for sharply attenuating said wave of constant frequency and means for detecting said waves in said band of frequencies to reproduce said signals.

ALEXANDER TYKULSKY.

No references cited.